(12) United States Patent
Hwang

(10) Patent No.: US 11,999,659 B2
(45) Date of Patent: Jun. 4, 2024

(54) HEALTH ARTIFICIAL PEARL AND MANUFACTURING METHOD THEREFOR

(71) Applicant: Yeon Ho Hwang, Busan (KR)

(72) Inventor: Yeon Ho Hwang, Busan (KR)

( * ) Notice: Subject to any disclaimer, the term of this patent is extended or adjusted under 35 U.S.C. 154(b) by 449 days.

(21) Appl. No.: 17/292,065

(22) PCT Filed: May 29, 2019

(86) PCT No.: PCT/KR2019/006459
§ 371 (c)(1),
(2) Date: Jun. 11, 2021

(87) PCT Pub. No.: WO2020/096151
PCT Pub. Date: May 14, 2020

(65) Prior Publication Data
US 2021/0395151 A1  Dec. 23, 2021

(30) Foreign Application Priority Data

Nov. 8, 2018  (KR) .................. 10-2018-0136493

(51) Int. Cl.
| | | |
|---|---|---|
| C04B 35/50 | (2006.01) | |
| A44C 17/00 | (2006.01) | |
| A44C 27/00 | (2006.01) | |
| B28B 3/02 | (2006.01) | |
| B28B 11/04 | (2006.01) | |
| B28B 11/08 | (2006.01) | |
| C04B 35/16 | (2006.01) | |
| C04B 35/626 | (2006.01) | |
| C04B 35/634 | (2006.01) | |
| C04B 35/645 | (2006.01) | |
| C04B 41/00 | (2006.01) | |
| C04B 41/45 | (2006.01) | |
| C04B 41/48 | (2006.01) | |
| C04B 41/83 | (2006.01) | |

(52) U.S. Cl.
CPC .............. *C04B 35/50* (2013.01); *A44C 17/00* (2013.01); *A44C 27/001* (2013.01); *B28B 3/025* (2013.01); *B28B 11/04* (2013.01); *B28B 11/0845* (2013.01); *C04B 35/16* (2013.01); *C04B 35/62655* (2013.01); *C04B 35/63416* (2013.01); *C04B 35/63488* (2013.01); *C04B 35/645* (2013.01); *C04B 41/009* (2013.01); *C04B 41/4568* (2013.01); *C04B 41/4803* (2013.01); *C04B 41/83* (2013.01); *C04B 2235/3229* (2013.01); *C04B 2235/3427* (2013.01); *C04B 2235/442* (2013.01)

(58) Field of Classification Search
CPC ..... B28B 3/025; B28B 11/04; B28B 11/0845; C04B 35/62655; C04B 35/645; C04B 41/4568; C04B 35/16; C04B 35/63416; C04B 35/63488; C04B 41/009; C04B 41/4803; C04B 41/83; C04B 2235/3229; C04B 2235/3427; C04B 2235/442; C04B 33/20; C04B 2235/528; C04B 2235/5436; C04B 2235/5463; C04B 2235/604; C04B 2235/6567; C04B 2235/96; C04B 2235/9646; C04B 35/50; C04B 35/6261; C04B 41/85; C04B 33/025; C04B 41/5012; Y02A 40/81; C09D 5/36
See application file for complete search history.

(56) References Cited

U.S. PATENT DOCUMENTS

2004/0139920 A1*  7/2004  Carty ................... A01K 61/57
119/244

FOREIGN PATENT DOCUMENTS

| JP | 2008237187 A | * 10/2008 |
|---|---|---|
| KR | 10-2005-0096140 | 10/2005 |
| KR | 20-0402792 | 12/2005 |
| KR | 10-2009-0119389 | 11/2009 |
| KR | 10-2010-0020847 | 2/2010 |
| KR | 10-1192116 | 10/2012 |
| KR | 10-1353137 | 1/2014 |

OTHER PUBLICATIONS

English translation of JP2008237187A retrieved from espacenet (Year: 2023).*
English Specification of 10-2005-0096140.
English Specification of 10-2010-0020847.
English Specification of 10-1192116.
English Specification of 10-2009-0119389.
English Specification of 20-0402792.
English Specification of 10-1353137.

* cited by examiner

*Primary Examiner* — Francisco W Tschen
*Assistant Examiner* — Elisa H Vera
(74) *Attorney, Agent, or Firm* — ANTONIO HA & U.S. PATENT, LLC

(57) ABSTRACT

The present invention relates to a health artificial pearl and a manufacturing method therefor and, more specifically, to: a health artificial pearl formed by spray-drying and pressure-firing a functional mineral that emits anions and radiates far infrared rays, so as to form a core with high compressive strength, and by coating the surface of the core with an artificial pearl composition, which is nontoxic to the human body; and a manufacturing method therefor. The method for manufacturing a health artificial pearl comprises: (S100) a material pretreatment step of wet-grinding a functional mineral that emits anions and radiates far infrared rays so as to form a wet-ground solution, and spray drying the wet-ground solution so as to prepare a powder for press forming; (S200) a press forming step of injecting, into a press forming apparatus, the powder for press forming so as to form a core, and high-temperature-firing the core; (S300) a core polishing step of polishing the high-temperature-fired core; and (S400) a coating step of coating the polished core with an artificial pearl composition.

8 Claims, No Drawings

HEALTH ARTIFICIAL PEARL AND MANUFACTURING METHOD THEREFOR

TECHNICAL FIELD

The present invention relates to a health artificial pearl and a method for manufacturing the same, and more particularly, to a health artificial pearl formed by spray-drying and press-sintering functional mineral powder emitting anions and far-infrared rays to thereby form a nucleus having high compressive strength and applying a non-toxic artificial pearl composition to the surface of the nucleus and a method for manufacturing the same.

BACKGROUND ART

The pearl symbolizes health, longevity, and wealth, and has been loved for its unique elegant and beautiful luster.

There are various types of pearls depending on the origin, color, and size, but ones that are more spherical, smooth and scratchless, and more glistening are more valuable.

Pearls are formed while shelled mollusks, such as pearly oysters, clams, or abalone, secrete calcium carbonate and protein to protect themselves against an irritant, such as a grain of sand or a piece of shell which is called a 'nucleus'. Pearls are classified into natural pearls and cultured pearls depending on whether the nucleus is placed inside naturally or artificially.

Natural pearls are rare and expensive, difficult to purchase, and prone to scratches and tricky to manage. Thus, cultured pearls are widely used, and the pearl market is accordingly expanding.

As a patent document related to conventional production of cultured pearls, Korean Patent Application Publication No. 10-2009-0119389 discloses a method for forming a cultured pearl nucleus, which mixes a pearl powder of poor merchantability and an oyster shell powder, a natural calcium powder, kneads the mixture with bone cement or epoxy resin, degas and form them to various sizes or spherical or heteromorphic shapes.

However, cultured pearls are much poorer in shape or shine than natural pearls and are thus less valued as gemstones. Further, cultured pearls take a long period of time to produce and their production is also limited.

To address such issues, artificial pearls have been mass-produced which are created by forming a nucleus shape using a piece of plastic or ceramic and coating the surface with a pearl paint.

As a conventional patent document related to production of artificial pearls, Korean Patent No. 10-1353137 discloses a method for manufacturing artificial pearls by applying a pearl pigment to the surface of the artificial pearl and alternately forming titanium dioxide thin layers and silicon dioxide thin films by sputtering.

Advantageously, artificial pearls look similar to natural pearls and have luster as do natural pearls. However, artificial pearls are of little or no merchantability because the pearl pigment is harmful, and artificial pearls are perceived as plastic or fake pearls.

Thus, in an effort to develop artificial pearls that may be healthful in addition to providing the aforementioned advantages, the inventor has developed a method for manufacturing artificial pearls aesthetic and healthy, by forming a pearl nucleus (core) with high compressive strength by grinding, press-forming, and high-temperature sintering a functional natural mineral that may give off anions and far-infrared rays, and coating the core with an artificial pearl composition.

DETAILED DESCRIPTION OF THE INVENTION

Technical Problems

To address the foregoing issues, the present invention aims to provide an artificial pearl, aesthetic and healthy, obtained by forming a pearl nucleus (core) with high compressive strength by grinding, press-forming, and high-temperature sintering a functional natural mineral that may give off anions and far-infrared rays, and coating the core with a non-toxic artificial pearl composition and a method for manufacturing the same.

Means to Address the Problems

To achieve the foregoing objects, according to the present invention, a method for manufacturing a health artificial pearl comprises a raw material pre-treatment step (S100) of forming a wet-ground solution by wet-grinding a functional mineral powder that emits anions and far-infrared rays and forming a powder for press-forming by spray-drying the wet-ground solution; a press-forming step (S200) of forming a core by inserting the powder for press-forming into a press-forming device and high-temperature sintering the core; a core polishing step (S300) of polishing the high-temperature sintered core; and a coating step (S400) of applying an artificial pearl composition to the polished core.

The raw material pre-treatment step (S100) includes a wet-ground solution preparation step (S110) of forming the wet-ground solution by adding 50 parts by weight to 70 parts by weight of the functional mineral emitting the anions and far-infrared rays to 100 parts by weight of water and wet-grinding the functional mineral to have an average particle size of 1000mesh to 1500mesh; and a spray-drying step (S120) of spray-drying the wet-ground solution using a spray-dryer set to an inlet temperature of 250° C. to 350° C., an outlet temperature of 150° C. to 250° C., a spray pressure of 5 kPa to 10 kPa, and a hot air volume of 0.30 m3/min to 0.50 m3/min.

The spray-drying step (S120) further includes a step of forming slurry for spray-drying using the wet-ground solution, wherein the slurry forming step forms the slurry for spray-drying by mixing any one additive among a dispersant, a binder, a plasticizer, an anti-forming agent, and a combination thereof with the wet-ground solution.

The press-forming step (S200) includes forming the core by inserting the powder for press-forming to a press-forming device and applying 600 kgf/cm$^2$ to 900 kgf/cm$^3$ to the core and sintering the core at 1000° C. to 1400° C. for 150 hours to 240 hours.

The coating step (S400) includes repeating, one to three times, applying a first artificial pearl composition containing an organic solvent, an artificial pearl pigment, and a cellulose compound to the polished core and drying the first artificial pearl composition at 40° C. to 80° C. for 2 hours to 4 hours.

The coating step (S400) further includes repeating, one to three times, applying a second artificial pearl composition containing the functional mineral powder emitting the anions and far-infrared rays to the first artificial pearl composition-applied and dried core and drying the second artificial pearl composition below) and 40° C. to 80° C. for 3 hours to 5 hours.

The second artificial pearl composition is prepared by mixing 5 parts by weight to 30 parts by weight of the functional mineral powder emitting the anions and far-infrared rays and having a size of 10 nm to 100 nm, relative to 100 parts by weight of the first artificial pearl composition.

The method further comprises a polishing step (S500) of polishing the coated core using a polishing solution containing a seashell powder after the coating step (S400).

To achieve the foregoing objects, according to the present invention, in a health artificial pearl, a powder for press-forming is formed by spray-drying a wet-ground solution obtained by wet-grinding a functional mineral emitting anions and far-infrared rays, a core is formed by press-forming and high-temperature sintering the powder for press-forming, and the core is polished and then coated with an artificial pearl composition.

According to the present invention, there is also provided a garment comprising the health artificial pearl.

According to the present invention, there is also provided a shoe comprising the health artificial pearl.

According to the present invention, there is also provided a fashion accessory comprising the health artificial pearl.

According to the present invention, there is also provided a fashion item comprising the health artificial pearl.

Effects of the Invention

As described above, by the healthy artificial pearl and method for manufacturing the same, the artificial pearl may have superior luster and quality and be healthful by forming a pearl nucleus (core) with high compressive strength by grinding, press-forming, and high-temperature sintering a functional natural mineral that may give off anions and far-infrared rays, and coating the surface of the pearl nucleus with a non-toxic artificial pearl composition.

Embodiments of the Invention

Specific features and advantages of the present invention are described below in detail with reference to the accompanying drawings. When determined to make the gist of the present invention unnecessarily unclear, a detailed description of the functions and features of the present invention are omitted.

The present invention relates to a method for manufacturing a health artificial pearl, and more particularly, to a method for manufacturing a health artificial pearl formed by spray-drying and press-sintering functional mineral powder emitting anions and far-infrared rays to thereby form a core having high compressive strength and applying a non-toxic artificial pearl composition to the surface of the core.

According to the present invention, a method for manufacturing a health artificial pearl includes a raw material pre-treatment step S100 including forming a wet-ground solution by wet-grinding a functional mineral powder that emits anions and far-infrared rays and forming a powder for press-forming by spray-drying the wet-ground solution, a press-forming step S200 including forming a core by inserting the powder for press-forming into a press-forming device and high-temperature sintering the core, a core polishing step S300 including polishing the high-temperature sintered core, and a coating step S400 including applying an artificial pearl composition to the polished core.

The raw material pre-treatment step S100 is a step to form a powder for press-forming, by forming a wet-ground solution by wet-grinding a raw material including a functional mineral powder which emits anions and far-infrared rays and spray-drying the wet-ground solution.

Specific examples of the functional raw material that emit anions and far-infrared rays may include kiyoseki, tourmaline, elvan, germanium, phyllite, vermiculite, Chungwangseok, ocher, sericite, amethyst, raw ore, Uiwangseok, obsidian, Kwangmyeongsuk, lava, phantom stone, charcoal, seaweed charcoal, binchotan charcoal, bamboo charcoal, bastnaesite, xenotime, fergusonite, ion adsorption type clay, and combinations thereof.

Other functional elements may include, but are not limited to, gold (Au), silver (Ag), silicon (Si), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), turium (Rm), ytterbium (Yb), lutetium (Lu), scandium (Sc), yttrium (Y), and combinations thereof.

The raw material has an average particle size of 300 mesh to 500 mesh, and using the raw material having the average particle size may reduce the processing time and facilitate grinding in the subsequent wet-grinding process, leading to superior processing efficiency.

In the step S110 of forming the wet-ground solution, 50 to 70 parts by weight of the prepared raw material, relative to 100 pails by weight of water, is put into a wet ball mill and ground to have an average particle size of 1000 mesh to 1500 mesh, forming a wet-ground solution.

As grinding conditions using the wet ball mill, grinding is performed at a rotation speed of 100 rpm to 2000 rpm for 150 hours to 300 hours. In this case, the diameter of the ball is 1 mm to 5 mm, and the material of the ball and the wet ball mill container may include any one or more of stainless steel, zirconia, alumina, chromium, and alloys thereof. The volume ratio of the raw material to the ball may be 1:5 to 10.

Further, the raw material pre-treatment step S100 may further include removing impurities contained in the raw material. Removing impurities may be performed before or after the wet-ground solution preparation step S110, and preferably, impurities may be removed after preparing the wet-ground solution.

The raw material may contain impurities, such as chloride or heavy metals, e.g., lead, cadmium, and chromium. By removing the impurities, a core with high compressive strength and smooth surface may be obtained, so that the pearl composition may be better coated, and the resultant artificial pearl may be harmless because it does not contain heavy metal.

In this case, the removal of impurities means removing the impurities, such as heavy metals, contained in the raw material, but may include selectively extracting functional raw materials emitting anions and far-infrared rays.

The removal of impurities according to a first embodiment is to use zinc powder, and 0.5 to 5 parts by weight of zinc powder having an average particle diameter of 1 to 30 µm is added to 100 parts by weight of the wet grinding solution or raw material suspension, and they are left to cause a cementation reaction with the heavy metals at 50 to 80° C., at 100 to 150 rpm, for 30 to 90 minutes, thereby precipitating and filtering out and removing the heavy metals.

The removal of impurities according to a second embodiment is to remove the heavy metals by adding a surfactant to form an agglomerate to which the heavy metals have been adsorbed by electrostatic attraction, cooling and precipitating the agglomerate, and then removing the heavy metals by filtering the precipitate.

The surfactant is a surfactant that may adsorb heavy metals, and the surfactant may be any one of anionic surfactants, nonionic surfactants, cationic surfactants, amphoteric surfactants, and combinations thereof, but it may be more preferable to use an anionic surfactant that may effectively adsorb positive ions of heavy metal and form an agglomerate by electrostatic attraction and precipitate the agglomerate.

The anionic surfactant may be selected from among carboxylic acid salts, sulfonic acid salts, sulfuric acid ester salts, phosphoric acid ester salts, and combinations thereof, and specific examples thereof may include, but are not limited to, sodium dodecyl sulfate (SDS), ammonium lauryl sulfate (ALS), sodium lauryl ethylene sulfate (SLES), linear alkylbenzene sulfonate (LAS), alpha-olefin sulfonate (AOS), alkyl sulfate (AS), alkyl ether sulfate (AES), sodium alkane sulfonate (SAS), and combinations thereof. More preferably, sodium dodecyl sulfate (SDS) may be used.

0.5 to 30 parts by weight of surfactant is added to 100 parts by weight of the wet grinding solution or the raw material suspension, and they are left to react for 1 hour to 6 hours to form a heavy metal-adsorbed agglomerate, and the agglomerate is cooled and precipitated at 3 to 5° C. and is then removed through a filtration process.

The removal of impurities according to a third embodiment is to selectively obtain a functional raw material that emits anions and far-infrared rays using an ion exchange resin and remove residues (impurities), and any one or more of diethyl triamine pentaacetic acid (DTPA), ethylenediamine tetra-acetic acid (EDTA), hydroxyl ethylethylenediamine triacetic acid (HEDTA), and combinations thereof are used as an eluent to selectively obtain the functional raw material that emits anions and far-infrared rays.

The removal of impurities according to a fourth embodiment is to selectively obtain a functional raw material that emits anions and far infrared rays through solvent extraction and remove residues (impurities).

More specifically, the wet-ground solution or raw material suspension (aqueous phase) and a solvent extractant (organic phase) are mixed to adsorb the functional raw material, which emits anions and far-infrared rays, contained in the aqueous phase to the organic phase, and the organic phase is scrubbed using an acid solution to thereby remove impurities other than the functional raw material, and the scrubbed organic phase is back-extracted into the aqueous phase using a back-extraction solvent to thereby obtain the functional raw material while removing the residues.

In this case, the solvent extractant may include any one of a phosphoric acid-based solvent, an oxime-based solvent, a trialkylphosphine-based solvent, an amine-based solvent, and combinations thereof, and preferably, an oxime-based solvent may be used.

Specific examples of the solvent extractant may include 2-hydroxy-5-nonylacetophenone oxime (trade name: LIX84), 5-dodecyl salicyl aldoxime (trade name; LIX860), a mixture (trade name: LIX984) of LIX84 and LIX860, Lix 973 (5-dodecyl-salicylad oxime), and 5-nonyl salicylad oxime (trade name: ACORGA M5640), as commercially available from Henkel, Germany.

As the phosphoric acid solvent, D2EHPA(di(2-ethylhexyl)phosphate acid) commercially available from SYTEK, the U.S.A., may be used. As the trialkylphosphine solvent, Cyanex 923 (trialkylphosphine oxide) from SYTEK, the U.S.A., may be used. As the amine-based solvent, secondary carbon primary amine (AN-19), trialkylamine (Alamine 336), and chloromethyltrialkylamine (Aliquat 336) may be used.

In the spray-drying step (S120), the wet-ground solution is spray-dried to prepare a powder for press-forming. More specifically, the wet-ground solution is spray-dried using a spray dryer set to an inlet temperature of 250 to 350° C., an outlet temperature of 150 to 250° C., a spray pressure of 5 to 10 kPa, and a hot air volume of 0.30 to 0.50 $m^3$/min.

The inlet temperature, outlet temperature, spray pressure, and blowing pressure of the spray dryer affect the shape and size of the powder for press-forming, which is to be prepared. If the inlet temperature of the spray dryer is less than 250° C. and if the outlet temperature of the spray dryer is less than 150° C., granules are not properly formed and are not sufficiently dried, so that the granules stick together to form agglomerates, or undried granules stick to the chamber wall of the spray dryer.

If the inlet temperature of the spray dryer exceeds 350° C. and if the outlet temperature of the spray dryer exceeds 250° C. the granules may be formed in non-uniform or non-spherical shapes.

The spray pressure is preferably 5 to 10 kPa. If the spray pressure is less than 5 kPa, the slurry may not be sufficiently sprayed or exists in bulk, rendering it difficult to form granules, and causing granules less dry. If the spray pressure exceeds 10 kPa, the granules may have non-spherical or non-uniform shapes. Thus, it is preferable not to exceed the range.

The hot air volume is preferably 0.30 to 0.50 $m^3$/min. If the hot air volume is less than 0.30 $m^3$/min, undried granules exist and may agglomerate with other dried granules or stick to the inner wall of the sprayer. If the hot air volume exceeds 0.50 $m^3$/min, the physical properties of the granules are deteriorated or have non-uniform shapes.

According to another embodiment, the spray-drying step S120 may further include the step of forming slurry for spray-drying, which mixes the wet-ground solution with any one additive among a dispersing agent, a binder, a plasticizer, an anti-foaming agent, and a combination thereof to thereby form slurry for spray-drying.

By forming the slurry for spray-drying, it is possible to further enhance the sinterability between the functional mineral powder particles in the subsequent press-forming step S200 and to obtain an artificial pearl core having a uniform shape and average particle diameter.

The dispersant prevents agglomeration between components during preparation of the slurry for spray-drying and during spray-drying, rendering it possible to obtain a powder having a uniform shape and a uniform particle size. The type of the dispersant is not limited as long as it is one for preventing agglomeration, but preferably, one of polycarboxylic acid, naphthalenesulfonic acid, phosphate, polyhydric alcohol ester, polyester, amine, sulfonic acid, nonionic surfactant and combinations thereof may be used. 0.1 to 0.5 parts by weight of the dispersant relative to 100 parts by weight of the evaporation concentrate is added. If the dispersant is added in an amount of less than 0.1 parts by weight, it is difficult to achieve an anti-agglomeration effect, and if the dispersant is added in excess of 0.5 parts by weight, the powders dispersed in the droplets are moved to the surface of the droplets when dried, forming a thick granular surface layer. Thus it is preferable not to fall outside the range.

The binder enhances the bonding property between the particles and thus viscosity. The binder is not limited as long as it is one for enhancing the viscosity, but as a specific example, any one of PUA, PUP, PEO, and combinations thereof may be used. The binder is added in an amount of 1 to 5 parts by weight relative to 100 parts by weight of the evaporation concentrate. If the binder is added in an amount of less than 1 part by weight, it is difficult to enhance viscosity. If the binder is added in excess of 5 parts by weight, the binder is separated from the granular surface layer as the moisture moves during spray-drying, forming a hard surface layer and destroying the granules due to the difference in pressure between the inside and outside of the granular surface, and resultantly rendering it difficult to obtain particles in a uniform shape. Thus, it is preferable not to fall outside the range.

The plasticizer prevents the viscosity of the slurry for spray-drying from excessively increasing and lowers the glass transition temperature to thereby facilitate breakage of the interface of the granules during spray-drying, thereby increasing sinterability. The plasticizer may be any one of glycol-based, glycerin-based, and phthalate-based plasticizer, but is not limited thereto. As a preferred example, any one of PEG, TEG, and combinations thereof may be used. 0.1 to 0.5 parts by weight of the plasticizer relative to 100 parts by weight of the evaporation concentrate is added. If the plasticizer is added in an amount of less than 0.1 parts by weight, it is difficult to achieve a viscosity control effect, and if the plasticizer is added in excess of 0.5 parts by weight, the viscosity is lowered, so that the particle diameter is reduced, and particles may agglomerate. Thus, it is preferable not to fall outside the range.

The anti-foaming agent removes air bubbles generated in the slurry for spray-drying by a reaction and stirring of organic substances, such as the plasticizer and binder, to thereby prevent the particles from deforming due to air bubbles. As the anti-foaming agent, any one of low-cost alcohol, mineral oil-based, silicone-based, non-silicone-based polymer anti-foaming agent, and combinations thereof may be used, but the present invention is not limited thereto. The anti-foaming agent may be added in an amount of 0.01 to 0.3 parts by weight relative to 100 parts by weight of the evaporation concentrate.

Further, the additive is included in an amount of 0.5 to 5 parts by weight relative to 100 parts by weight of the wet grinding solution. If the additive is added in an amount of less than 0.5 parts by weight, it is difficult to achieve the above-described effects. If the additive is added in excess of 5 parts by weight, the compressive strength of the artificial pearl core is reduced due to addition of a large amount of organic material. Thus, it is preferable not to fall outside the range.

Further, the slurry for spray-drying may be formed at a temperature of 50° C., 50 to 700 cps, preferably 100 to 300 cps, so as to easily control the shape and particle diameter of the powder upon spray-drying.

In the press-forming step S200, the power for press-forming is inserted into a press-forming device to thereby form a ball-shaped core, and the core is sintered at a high temperature.

In this case, the powder for press-forming is put into the press-forming device, and a pressure of 600 to 900 kgf/cm$^2$ is applied to form the core. If the pressing pressure is less than 600 kgf/cm$^2$, it is difficult to obtain a high strength core and, if the pressing pressure exceeds 900 kgf/cm$^2$, the core may be cracked due to the unnecessarily high pressure. Thus, it is preferable not to fall outside the range.

The formed core may be sintered at 1000 to 1400° C. for 150 to 240 hours to remove and evaporate moisture, organic additives, and residual impurities present in the core while further enhancing the compressive strength of the core.

In this case, the sintering temperature is set to 1000 to 1400° C. If the sintering temperature is less than 1000° C., it is difficult to increase the compressive strength of the core and, if the sintering temperature exceeds 1400° C., an increase in compressive strength compared to the increase in temperature is insignificant, and thus, it is not preferable in light of process efficiency.

Further, the sintering process is performed for 150 to 240 hours. If the sintering time is less than 150 hours, it is difficult to have sufficient compressive strength, and if the sintering time exceeds 240 hours, it is inefficient because the increase in compressive strength compared to the sintering time is insignificant.

Meanwhile, if the press-formed core is abruptly exposed to a high temperature, volatilization and evaporation of moisture, organic additives, and residual impurities inside the core drastically proceed, and cracks may occur between the powder particles for press-forming in the core, rendering it difficult to obtain a core with high compressive strength.

To address these issues, it is preferable to gradually increase the sintering temperature so that moisture, organic additives and residual impurities present in the core are gradually volatilized, thereby preventing cracks from occurring between the powder particles for press-forming in the core and allowing it to have a higher compressive strength. More specifically, a first sintering process may be performed at 1000 to 1100° C. for 10 hours to 20 hours, and a second sintering process may be performed at 1100 to 1400° C. for 140 hours to 220 hours.

In the core polishing step S300, the high-temperature sintered core is polished to smooth the surface of the core. Water and the high-temperature sintered core in a weight ratio of 1 to 2:1 are put in a wet ball mill and are left to polishing for five days to seven days.

Polishing conditions using the wet ball mill include a rotation speed of 100 rpm to 2000 rpm and a ball diameter of 1 mm to 5 mm, and the material of the ball and the wet ball mill container may include any one or more of stainless steel, zirconia, alumina, chromium, and alloys thereof. The volume ratio of the raw material to the ball may be 1: 5 to 10.

In the coating step S400, an artificial pearl composition is applied to the polished core.

In the coating step S400, the process of applying a first artificial pearl composition containing an organic solvent, an artificial pearl pigment, and a cellulose compound to the polished core and drying it at 40 to 80° C. for 2 to 4 hours is repeated 1 to 3 times.

The first artificial pearl composition is composed of 40 to 55 parts by weight of the artificial pearl pigment and 10 to 20 parts by weight of the cellulose compound relative to 100 parts by weight of the organic solvent.

The organic solvent is not limited as long as it has excellent solubility in the cellulose compound, but specific examples thereof may include any one of butyl acetate, ethyl acetate, acetone, amyl acetate, isopropyl alcohol, ethyl alcohol, toluene, butyl alcohol, octanol, and combinations thereof.

The artificial pearl pigment may include any one of bismuth oxychloride, lead chloride, titanium dioxide, and combinations thereof, but it is preferable to use bismuth oxychloride, which is harmless to the human body and capable of expressing a soft and brilliant texture.

When using titanium dioxide, it is preferable to use a rutile type, and the rutile type titanium dioxide has high hiding power on the surface of the core and excellent light reflection power.

Further, it is preferable to use the artificial pearl pigment having an average particle diameter of 5 to 50 μm. If the average particle diameter exceeds 50 μm, it is difficult to form a smooth surface, and if the average particle diameter is less than 1 μm, the particles may agglomerate. Thus, the artificial pearl pigment is rendered not to fall outside the range.

As the cellulose compound, any one of nitrocellulose, cellulose acetate, cellulose, and combinations thereof may be selected.

Further, the first artificial pearl composition may further include 3 to 10 parts by weight of an ultraviolet stabilizer relative to 100 parts by weight of the organic solvent.

The ultraviolet stabilizer is not limited as long as it has stability against ultraviolet rays, and specific examples thereof may include any one of benzophenone-based, benzotriazole-based, salicylic acid ester-based and combinations thereof. More preferably, a benzophenone-based ultraviolet stabilizer may be used.

Further, the first artificial pearl composition is preferably formed to have a viscosity of 20 to 150 cps at 25° C. If the viscosity is less than 20 cps, the shielding property is deteriorated, requiring that coating and drying be performed. If the viscosity exceeds 150 cps, it is difficult to apply a thin coat, and the surface is not smooth but may be uneven. Thus, it is preferable not to fall outside the viscosity range.

The method for applying the artificial pearl composition to the polished core is not limited, but specific examples thereof include electrostatic spray deposition, dipping, and the like.

Preferably, dipping may be used for the first application, and electrostatic spray deposition may be used for the second or more application.

When using the dipping method, it is preferable to maintain the temperature of the first artificial pearl composition at 35 to 80° C. to thereby prevent the viscosity from sharply changing by heating the dipping water tank.

The principle and method for the electrostatic spray deposition are well known, and no description thereof is given.

It is affected by various conditions, such as applied voltage and temperature during electrostatic spray deposition, and in the present invention, before spraying, the core temperature is maintained at 150 to 300° C., and the applied voltage is controlled to 10 to 30 kV.

It is preferable to apply the first artificial pearl composition after maintaining the temperature of the core at 150 to 300° C. If electrostatic spraying is performed when the core temperature is less than 150° C., the first artificial pearl composition sprayed from the nozzle is not sufficiently evaporated due to the relatively low temperature while moving to the core, and may thus reach the core in the wet state, and the first artificial pearl composition may be rapidly dried, causing cracks. If the temperature of the core exceeds 300° C., most of the first artificial pearl composition sprayed from the nozzle is dried while moving to the surface of the core and reaches in a solid phase, so that the roughness of the thin film increases.

It is preferable that the applied voltage is controlled to be 10 to 30 kV. If the applied voltage is less than 10 kV, an insignificant influence is had on the applicability as compared with the applied voltage, and thus, unnecessary power consumption occurs or the coat film pre-formed on the surface of the core may be pushed away by the first artificial pearl composition, causing the coat film uneven. Thus, it is preferable not to fall outside the applied voltage range.

Further, in the present invention, the spray rate of electrostatic spray deposition is controlled to be 1 to 5 ml/hr, the distance between the spray nozzle and the core is adjusted to 5 to 15 cm, and the inner diameter of the nozzle is 0.1 to 0.5 mm, and the outer diameter of the nozzle is 0.2 to 1 mm.

After the first artificial pearl composition is applied to the core, a drying process is performed at 40 to 80° C. for 2 to 4 hours to fix the first artificial pearl composition to the surface of the core.

The application and drying process of the first artificial pearl composition may be repeated 1 to 10 times, and even when the application and drying process is repeated, the blending ratio of the first artificial pearl composition is designed to be the same, or the blending ratio and the viscosity may be adjusted within the above described ranges.

As another embodiment of the coating step S400, there may be further included the step of repeating, one to three times, applying a second artificial pearl composition containing a natural raw material capable of emitting anions and far infrared rays to the core where the first artificial pearl composition has been applied and dried and drying at 40 to 80° C. for three to five hours.

The kind of natural raw material capable of emitting anions and far-infrared rays has been described above in connection with the raw material pre-treatment step S100, and no description thereof is given.

The raw material may be a raw material from which impurities have been removed by the impurity removal process described in connection with the raw material pre-treatment step S100.

The second artificial pearl composition includes a functional raw material capable of emitting anions and far-infrared rays (hereinafter, simply referred to as 'functional raw material') and may be coated on the outermost surface of the core to reinforce the effective functions and anion and far-infrared emission effects of the functional raw material.

In this case, the second artificial pearl composition is prepared by mixing 5 to 30 parts by weight of raw material having a size of 10 to 100 nm, relative to 100 parts by weight of the first artificial pearl composition.

The raw material has a size of 10 to 100 nm. If the size of the raw material is less than 10 nm, agglomeration occurs during dispersion, making it difficult to obtain high-quality artificial pearls. If the size of the raw material exceeds 100 nm, the surface of the core may be uneven, causing poor reflection and luster. Thus, it is preferable to use a raw powder that has a particle size that does not fall outside the range.

5 to 30 parts by weight of the raw material is mixed relative to 100 parts by weight of the first artificial pearl composition. If the raw material is added in an amount of less than 5 parts by weight, the anion and far-infrared emission effect of the raw material may be less exhibited, and if the amount of the raw material added exceeds 30 parts by weight, it is difficult to implement glossy and vibrant colors. Thus, it is preferable not to fall outside the range.

The method for manufacturing a health artificial pearl according to the present invention includes a polishing step S500 of polishing the surface of the coated core after the coating step S400.

The luster-treating step S500 may be performed using a polishing device, such as a wet ball mill and a barrel machine, and polishing is performed at a rotation speed of 100 to 300 rpm for 12 to 48 hours, and the diameter of the ball may be 1 to 5 mm. In this case, the balls may be formed of silica, stainless steel, zirconia, alumina, chromium, and an alloy thereof, or a seashell powder may be used instead of, or together with the balls.

More specifically, water and seashell powder having an average particle size of 50 to 150 μm, in a weight ratio of 1 to 5:1, are mixed and dispersed to form a polishing solution, and the polishing solution and the coated core in a weight ratio of 1 to 2:1 are put in the polishing device to polish the surface of the coated core.

Described below is a health artificial pearl according to the present invention.

According to the present invention, a health artificial pearl is manufactured by forming a powder for press-forming by spray-drying a wet-ground solution, which is obtained by wet-grinding a functional mineral emitting anions and far-infrared rays, forming a core by press-forming and high-temperature sintering the powder for press-forming, polishing the core, and then coating the polished core with an artificial pearl composition.

The health artificial pearl according to the present invention is manufactured by the above-described method, and the components of the health artificial pearl, and the method of processing the components have been described above, and a description thereof is omitted.

The healthy artificial pearl according to the present invention may have superior luster and quality and be healthful by forming a core with high compressive strength by grinding, press-forming, and high-temperature sintering a functional natural mineral that may give off anions and far-infrared rays, and coating the surface of the core with a non-toxic artificial pearl composition.

Further, the present invention provides various uses of the health artificial pearl having the above characteristics.

The health artificial pearl according to the present invention may be applied to clothing, shoes, fashion accessories, and fashion items, but s not limited thereto.

The clothing according to the present invention may be one or more selected from the group consisting of suits, dresses, one-pieces, two-pieces, leather jackets, jumpers, coats, skirts, shirts, sweaters, jeans, children's clothes, outerwear, pants, skirt shorts, and T-shirts, but is not limited thereto.

The shoes according to the present invention may be one or more selected from the group consisting of high heels, loafers, sneakers, slippers, children's shoes and sports shoes, but are not limited thereto.

The fashion accessories according to the present invention may be one or more selected from the group consisting of earrings, bracelets, rings, necklaces, brooches, hairpins, hair bands, scrunchies, piercings, anklets, key fobs, and watches, but are not limited thereto.

The fashion items according to the present invention may be one or more selected from the group consisting of hats, bags, scarves, wallets, fountain pens, pouches, umbrellas, parasols, gloves, sunglasses, and glasses, but are not limited thereto.

For the health artificial pearl according to the present invention, a proper size and color may be selected and applied depending on its use.

Hereinafter, exemplary embodiments of the present invention are described in detail with reference to the accompanying drawings.

1. Preparation and Pre-Treatment of Raw Materials 1-1. Preparation of Raw Materials 600 g of bastnaesite powder obtained from a mine in Chungju, South Korea, 600 g of kyoseki powder, and 600 g of tourmaline were prepared. The raw materials had average particle sizes of 230 mesh, 180 mesh, and 170 mesh, respectively, and were ground to have an average particle size of 325 mesh using a grinding device.

1-2. Preparation of Wet Grinding Solution

The ground raw materials and water in a weight ratio of 6 (1800 g):4 (1200 g) were put in a 6 L pot mill and were ground at 450 to 500 rpm for 300 hours, forming a wet grinding solution having an average particle size of 1200 mesh. In this case, a zirconia ball having a diameter of 2 mm was used, and the volume ratio of the raw materials to the balls was 1:5. The viscosity of the prepared wet grinding solution was identified to be 90 cps.

1-3. Preparation of Slurry for Spray-Drying

Additives were added to the wet ball mill solution to prepare slurry for spray-drying. A nonionic dispersant as an additive, PVA as a binder, PEG as a plasticizer, and ethanol as an anti-foaming agent were prepared. In the mix proportions, 0.3 g of dispersant, 3 g of blender, 0.3 g of plasticizer, and 0.01 g of anti-foaming agent per 100 g of wet ball mill solution were included. The wet ball mill solution and the dispersant were first mixed, and the binder and the plasticizer were second added and mixed, and then the anti-foaming agent was third added for defoaming. The viscosity of the prepared slurry for spray-drying was identified to be 125 cps at 25° C.

1-4. Spray-Drying

Spray-drying was performed under the same spray-drying conditions so as to identify the shape and particle size distribution of the powder formed when the wet grinding solution was spray-dried (embodiment 1) and when the slurry for spray-drying (wet grinding solution+additives) was spray-dried (embodiment 2). Further, to identify the shape and particle size distribution characteristics of the powder depending on spray pressure, the slurry for spray-drying was spray-dried at the spray pressures of 3 Kpa (comparative example 1), 10 Kpa (embodiment 3), and 15 kPa (comparative example 2).

During spray drying, the inlet temperature of the spray drying device was set to 250° C., the outlet temperature to 175° C., and the hot air volume to 0.50 m³/min.

The shape was described on a 5-point scale. (when the hollow spherical particles are observed as being within 5%: 5 points, when the hollow spherical particles are observed as being within 30%: 4 points, when the hollow spherical particles are observed as being within 50%: 3 points, when flaky and fractured particles are observed as being within 10%: 2 points, when flaky and fractured particles are observed as exceeding 10%: 1 point)

Table 1 below shows the shape and particle size characteristics of the powders for press-forming, prepared in embodiments 1 to 3 and comparative examples 1 to 2.

TABLE 1

|  | Shape | Particle size distribution (μm) | Average particle diameter (μm) |
| --- | --- | --- | --- |
| Embodiment 1 | 4 points | 11.5 to 59.7 | 35.8 |
| Embodiment 2 | 5 points | 5.8 to 34.5 | 16.5 |
| Embodiment 3 | 5 points | 3.4 to 29.4 | 17.4 |

TABLE 1-continued

|  | Shape | Particle size distribution (μm) | Average particle diameter (μm) |
|---|---|---|---|
| Comparison Example 1 | 1 point | 35.6 to 167.8 | 84.3 |
| Comparison Example 2 | 1 point | 3.5 to 115.6 | 68.6 |

Compared with when the wet-ground solution was spray-dried (embodiment 1), when the slurry for spray-drying (wet-ground solution+additives) was spray-dried (embodiment 2), the particle size distribution was small, no hollow spherical particles were observed, and powder with uniform, spherical shapes was obtained. This was determined to be attributed to being able to control, e.g., agglomeration, viscosity, and moisture movement under the optimal conditions upon spray-drying, by adding the additives. It was also determined from comparative examples 1 and 2 that it was preferable to control the spray pressure to be 5 kPa to 10 kPa as a low-quality powder was objected when the spray pressure was too high or low.

2. Preparation of Core

The powder for press-forming prepared by embodiments 1 and 2 was press-formed, and the compressive strength of the core depending on the press pressure was checked. After press-forming was complete, all the samples were sintered at the same temperature (1210° C.) for the same period of time (150 hours) and, after sintering, the compressive strength was checked. Table 2 below shows the compressive strength according to the press-forming pressure.

TABLE 2

| Powder for press-forming | Press pressure (kgf/cm$^2$) | Compressive strength (Mpa) |
|---|---|---|
| Embodiment 1 | 500 | 8.7 |
|  | 700 | 19.5 |
|  | 1000 | 21.3 |
| Embodiment 2 | 500 | 15.5 |
|  | 700 | 28.3 |
|  | 1000 | 30.4 |

The compressive strength was higher when the slurry for spray-drying was prepared and spray-dried (embodiment 2) than when spray-drying (embodiment 1) was performed without processing the wet-ground solution and it was so determined because when spray-drying was performed after the slurry for spray-drying was prepared, the powder had a uniform shape and particle size distribution as shown in Table 1 above, so that pores were minimized and packing density was able to be enhanced upon press-forming. Thereafter, a core obtained by press-forming the powder prepared in embodiment 2 at 700 kgf/cm$^2$ was used in the experiment. The high-temperature sintered core was subjected to water polishing for seven days using a wet ball mill.

3. Coating Treatment 3-1. Preparation of Coating Composition

Nitrocellulose, as a cellulose compound, a mixture of butyl acetate and isopropyl alcohol in a weight ratio of 10:1, as a solvent, and benzophenone-3, as a UV stabilizer, were prepared. As a pearl pigment, bismuth oxychloride and titanium dioxide were mixed and prepared in a weight ratio of 8:2. In this case, rutile-type titanium dioxide having an average particle diameter of 2.1 μm was prepared.

A coating composition was formed by mixing and stirring nitrocellulose and the UV stabilizer in the solvent, and adding and stirring the pearl pigment.

As a first artificial pearl composition, a composition for initial coating was prepared by mixing 1000 g of solvent, 120 g of nitrocellulose, and 550 g of pearl pigment, a composition for intermediate coating was prepared by mixing 1000 g of solvent, 120 g of nitrocellulose, 400 g of pearl pigment, and 30 g of UV stabilizer, and a composition for top coating was prepared by mixing 1000 g of solvent, 100 g of nitrocellulose, 450 g of pearl pigment, and 50 g of UV stabilizer.

A second artificial pearl composition was prepared by adding 200 g of mineral powder to the above-mentioned composition for top coating, mixing and stirring nitrocellulose and a UV stabilizer in a solvent, and adding and stirring pearl pigment and mineral powder. In this case, as the minerals, the same raw materials as those described above in connection with 1-1 were used, and were nano-ground into powder having a size of 12 nm.

3-2. Application and Drying of the Coating Compositions

The composition for initial coating was applied two times, the composition for intermediate coating was applied once, and the composition for top coating was applied once, and the second artificial pearl composition which includes additional minerals was applied twice.

For the first application, the core was coated using a dipping method, and for the second or subsequent application, the core was coated using electrostatic spray deposition. After each application, drying was performed using a hot air dryer at 60° C. for 3 hours.

Conditions for electrostatic spray deposition were set so that the inner diameter of the nozzle was 0.3 mm, the outer diameter as 0.8 mm, the spray rate was 3 ml/hr, and the distance between the spray nozzle and the core was about 6 cm. The applied voltage was 15 kV, and the surface temperature of the core was controlled to be 175° C. prior to application of the compositions.

Further, to identify the anion emission effect depending on whether to coat with the second artificial pearl composition, a sample not coated with the second artificial pearl composition was prepared.

4. Polishing

A polishing solution and the coated core were put in a rotary barrel polishing machine and subjected to polishing at a rotation speed of 150 rpm for 12 hours. The polishing solution was prepared by mixing 200 g of seashell powder having an average particle size of 65 μm and 1000 g of water, and 600 g of the coated core was put in.

It was observed that the manufactured artificial pearls had a body color uniformly treated and excellent light reflectivity and luster. It was also identified that high-quality artificial pearls, which had no flaws on the surface and were comparable to high-quality natural pearls, could be manufactured.

5. Anions and Far-Infrared Emissions

Analysis of far-infrared radiation characteristics and anion emissions was conducted by the Korea Institute of Far Infrared Applied Estimation.

The far-infrared radiation characteristics were analyzed using the emissivity and radiation energy measurement method (KFIA-FI-1005) by an infrared spectrophotometer, and the results of measurement, as compared to the BLACK body using an FT-IR spectrometer, were identified.

The anions were analyzed using the KFIA-FI-1042 method, and a test was performed using 10 g of test piece, under the conditions of a room temperature of 26° C., a humidity of 55%, and 116/cc of anion water in the air using a charged particle measuring device. Anions emitted from the object under measurement were measured, and the result value was displayed as the number of ions per unit volume.

As samples, a natural pearl commercially available, a plastic artificial pearl, an artificial pearl coated with only the first artificial pearl composition (hereinafter, referred to as a "first artificial pearl"), and an artificial pearl coated with the second artificial pearl composition in addition to the first artificial pearl composition (hereinafter, referred to as a "second artificial pearl") were prepared and compared for far-infrared and anion emissions.

As a result, the respective anion measurements of the commercially available natural pearl, plastic artificial pearl, first artificial pearl, and second artificial pearl were 697 ions/cc, 21 ions/cc, 2488 ions/cc, and 2742 ions/cc, respectively, and it was thus identified that the anion emissivity of artificial pearls according to the present invention was superior to that of commercially available natural pearls and plastic artificial pearls and that more excellent anion emissivity was obtained if further coated with the second artificial pearl composition.

For far-infrared radiation energy, the commercially available natural pearl, plastic artificial pearl, first artificial pearl, and second artificial pearl were measured as $3.09 \times 10^2$ (W/m$^2$·µm, 37° C.), $0.81 \times 10^2$ (W/m$^2$·µm, 37° C.), $3.55 \times 10^2$ (W/m$^2$·µm, 37° C.), and $3.57 \times 10^2$ (W/m$^2$·µm, 37° C.), respectively.

For far-infrared emissivity (5 to 20 µm), the commercially available natural pearl, plastic artificial pearl, first artificial pearl, and second artificial pearl were measured as 0.879, 0.541, 0.922, and 0937, respectively.

It was identified that the far-infrared radiation properties of the artificial pearls according to the present invention were superior to those of commercially available natural pearls and plastic artificial pearls, and when the second artificial pearl composition was additionally applied, more excellent far-infrared radiation properties were shown.

6. Elemental Analysis

Table 3 shows the results of elemental analysis of the first artificial pearls prepared by the method for manufacturing artificial pearls according to the present invention.

TABLE 3

| Element | Content (mg/kg) |
|---|---|
| Y | 544 |
| La | 526 |
| Ce | 1000 |
| Pr | 130 |
| Nd | 450 |
| Sm | 95.0 |
| Eu | 6.25 |
| Gd | 95.9 |
| Tb | 18.3 |
| Dy | 100 |
| Ho | 22.0 |
| Er | 58.8 |
| Tm | 9.68 |
| Yb | 54.1 |
| Lu | 9.12 |
| Th | 178 |
| U | 37.3 |

The elemental analysis was conducted by the Korea Institute of Geoscience and Mineral Resources, using ICP-MS and acid digestion as pretreatment. In this case, the test environment temperature was 23±2° C., and the humidity was 30±5% R.H.

As a result, it was identified that the first artificial pearl contained a large amount of elements, such as Ce, Y, La, and Nd, which have excellent cell activation, immunity enhancement, anion and far-infrared emission effects.

7. Heavy Metal Detection

Heavy metal analysis was conducted by the Korea Institute of Far Infrared Applied Estimation.

After acid digestion of the samples, Pb, As, Cd, and Hg were analyzed using ICP-OES (inductively coupled plasma-optical emission spectroscopy) and a mercury analyzer.

The Pb, As (detection limit=10 mg/kg), Hg, and Cd (detection limit=5 mg/kg) samples were subjected to extraction using 50 ml alkaline solution (Na$_2$CO$_3$+NaOH+MgCl$_2$+phosphate buffer) at 90° C. for 1 hour, and then, Cr$^{6+}$ (detection limit=1 mg/kg) was analyzed using a UV/VIS spectrophotometer (EPA 3060A, 540 nm).

As a result of heavy metal test for the first artificial pearl, it was identified that none of the target heavy metal elements (Pb, As, Cd, Cr$^{6+}$, and Hg) were detected.

Although preferred embodiments of the present invention have been described above, various changes or modifications may be made thereto by one of ordinary skill in the art without departing from the technical spirit and scope of the claims. Accordingly, the scope of the present invention should be interpreted by the following claims described to include such various changes.

The invention claimed is:

1. A method for manufacturing a health pearl, method comprising:
   a raw material pre-treatment step (S100) of forming a wet-ground solution by wet-grinding a functional mineral that emits anions and far-infrared rays and forming a powder for press-forming by spray-drying the wet-ground solution;
   a press-forming step (S200) of forming a core by inserting the powder for press-forming into a press-forming device and high-temperature sintering the core;
   a core polishing step (S300) of polishing the high-temperature sintered core; and
   a coating step (S400) of applying an artificial pearl composition to the polished core, wherein the raw material pre-treatment step (S100) includes a wet-ground solution preparation step (S110) of forming the wet-ground solution by adding 50 parts by weight to 70 parts by weight of the functional mineral to 100 parts by weight of water and wet-grinding the functional mineral to have an average particle size of 1000mesh to 1500mesh; and a spray-drying step (S120) of spray-drying the wet-ground solution using a spray-dryer set to an inlet temperature of 250° C. to 350° C., an outlet temperature of 150° C. to 250° C., a spray pressure of 5 kPa to 10 kPa, and a hot air volume of 0.30 m$^3$/min to 0.50 m$^3$/min.

2. The method of claim 1, wherein the spray-drying step (S120) further includes a step of forming slurry for spray-drying using the wet-ground solution, wherein the slurry forming step forms the slurry for spray-drying by mixing any one additive among a dispersant, a binder, a plasticizer, an anti-forming agent, and a combination thereof with the wet-ground solution.

3. The method of claim 1, wherein the press-forming step (S200) includes forming the core by inserting the powder for press-forming to a press-forming device and applying 600 kgf/cm$^3$ to 900 kgf/cm$^3$ to the core and sintering the core at 1000° C. to 1400° C. for 150 hours to 240 hours.

4. The method of claim 1, wherein the coating step (S400) includes repeating, one to three times, applying a first artificial pearl composition containing an organic solvent, an artificial pearl pigment, and a cellulose compound to the polished core and drying the first artificial pearl composition at 40° C. to 80° C. for 2 hours to 4 hours.

5. The method of claim 4, wherein the coating step (S400) further includes repeating, one to three times, applying a second artificial pearl composition containing the functional mineral emitting the anions and far-infrared rays to the first artificial pearl composition-applied and dried core and drying the second artificial pearl composition at 40° C. to 80° C. for 3 hours to 5 hours.

6. The method of claim 5, wherein the second artificial pearl composition is prepared by mixing 5 parts by weight to 30 parts by weight of the functional mineral having a size of 10 nm to 100 nm, relative to 100 parts by weight of the first artificial pearl composition.

7. The method of claim 1, further comprising a polishing step (S500) of polishing the coated core using a polishing solution containing a seashell powder after the coating step (S400).

8. A health artificial pearl manufactured by the method of claim 1, wherein the powder for press-forming is formed by spray-drying the wet-ground solution obtained by wet-grinding the functional mineral emitting the anions and the far-infrared rays, wherein the core is formed by press-forming and high-temperature sintering the powder for press-forming, and wherein the core is polished and then coated with the artificial pearl composition.

\* \* \* \* \*